United States Patent [19]
Weber

[11] Patent Number: 6,015,179
[45] Date of Patent: Jan. 18, 2000

[54] DEVICE FOR MOUNTING A HYDRAULICALLY OPERATED TAILGATE ON A TRUCK

[76] Inventor: Walter Weber, Ovocna 4, 85110 Bratislava, Slovakia

[21] Appl. No.: 09/029,927

[22] PCT Filed: Sep. 5, 1996

[86] PCT No.: PCT/AT96/00158

§ 371 Date: Mar. 9, 1998

§ 102(e) Date: Mar. 9, 1998

[87] PCT Pub. No.: WO97/09197

PCT Pub. Date: Mar. 13, 1997

[30] Foreign Application Priority Data

Sep. 7, 1995 [AT] Austria ..................................... 1487/95
Dec. 1, 1995 [AT] Austria ..................................... 1970/95

[51] Int. Cl.$^7$ .................................................. B62D 25/00
[52] U.S. Cl. .......................... 296/57.1; 296/50; 296/51; 414/556; 414/557
[58] Field of Search ............................ 296/50, 51, 57.1; 414/557, 556

[56] References Cited

U.S. PATENT DOCUMENTS

| | | | |
|---|---|---|---|
| 2,696,923 | 12/1954 | Messick | 414/557 |
| 2,822,938 | 2/1958 | Ormsby | 414/557 |
| 2,850,187 | 9/1958 | Roberts | 296/57.1 |
| 2,889,059 | 6/1959 | Selzer | 414/557 |
| 3,057,491 | 10/1962 | Schlensker | 414/557 |
| 3,977,544 | 8/1976 | D'Hollander | 414/557 |

FOREIGN PATENT DOCUMENTS

| | | | |
|---|---|---|---|
| 553670 | 3/1958 | Canada | 414/557 |
| 0273865 | 7/1988 | European Pat. Off. | 414/557 |
| 0347791 | 12/1989 | European Pat. Off. | B23P 15/00 |
| 0662405 | 7/1995 | European Pat. Off. | B60P 1/44 |
| 2575709 | 7/1986 | France | 414/557 |
| 2704300 | 10/1994 | France | F16S 3/00 |
| 2313458 | 9/1974 | Germany | B23P 13/04 |
| 3129789 | 2/1983 | Germany | B62D 33/02 |
| 3537938 | 2/1987 | Germany | 414/557 |
| 3627476 | 2/1988 | Germany | 414/557 |

*Primary Examiner*—Joseph D. Pape
*Assistant Examiner*—Kiran Patel
*Attorney, Agent, or Firm*—Karl Hormann

[57] ABSTRACT

Mounting device for a hydraulically actuated tailgate of a truck having a transverse support mountable to the rear of the vehicle frame and provided with support flanges (4) spaced from each other symmetrically relative to the longitudinal center plane of the vehicle and provided with through-channels (5', 5", 5'") for support bolts of lift and pivot devices of the tailgate, the transverse support on the vehicle being formed of an extruded hollow box profile (1) made of aluminum of essentially tetragonal cross-section which at its upper surface (1') and its lower surface (1") is provided with continuous grooves (3', 3") extending over the length of the profile for positively and frictionally snap-receiving the ends of cantilever arms (4", 4'") of the support flanges, the support flanges being formed of sections of an extruded aluminum hollow profile and that at the front surface of the tailgate there are also provided support flanges formed from sections of an extruded hollow profile of aluminum which are provided with cylindrical through-passages for receiving support bolts of the lift and pivot devices and which are welded to the loading platform proper.

1 Claim, 5 Drawing Sheets

DEVICE FOR MOUNTING A HYDRAULICALLY OPERATED TAILGATE ON A TRUCK

BACKGROUND OF THE INVENTION

1. Field of the Invention

The invention relates to a mounting device for a hydraulically actuated tailgate of a truck, having a transverse support for the tailgate adapted to be mounted at the rear of the vehicular frame and on which are provided, spaced from each other symmetrically relative to the center plane of the vehicle, support flanges provided with through-channels for support bolts of lifting and pivoting devices of the

2. The State of the Art

In known tailgate structures the vehicle-mounted transverse support for the tailgate usually is a tetragonal pipe receiving having tetragonal sleeves provided with support flanges for the lifting and pivoting devices welded thereto (DE 31 29 789) or on which the sleeves are slided from both sides and anchored thereto by holding clamps or other fasteners, such as threaded bolts. The support flanges which are provided with precisely machined cylindrical receptacles for the support bolts of the lifting arms and pivoting devices have to be conformed to the tetragonal sleeves and they have to be welded to them. At those positions of the front surface of the tailgate which are to be engaged by the lifting arms and pivoting devices, inserts formed as special castings have to be provided. These inserts are also provided with machined support bolt receptacles, and they have to be welded to tailgate struts as well as with the tailgate proper.

Overall, this known construction has been found to be rather complex, because it requires a plurality of separate components which have subsequently to be assembled by welding and screwing. Not only do such components involve complex manufacture, but they also increase the weight of the vehicle and require extended assembly times. Moreover, with vehicles of different widths each type of vehicle necessitates a special component set.

OBJECTS OF THE INVENTION

The invention aims at providing a mounting device of the kind referred to in the introduction which may be manufactured in a simple and cost-efficient manner, which requires few component parts, which may be quickly mounted, and which is easily adaptable to different types of vehicles. while at the same time reducing weight.

BRIEF SUMMARY OF THE INVENTION

In accordance with the invention, the mounting device is characterized by the lateral support strut for mounting on a vehicle comprising an extruded box profile of substantially tetragonal cross-section made of aluminum and provided at its upper and lower surfaces with continuous grooves extending along the entire box profile for positively and frictionally receiving the ends of cantilevers of the support flanges for the lifting and pivoting devices. The support flanges are made from sections of an extruded hollow aluminum tubes. Such support flanges are also provided on the forward surface of the tailgate. They are provided with cylindrical through-channels for receiving support bolts of the lifting and pivoting devices and are welded to the loading platform.

In a preferred embodiment the ends of the cantilevers inserted into the elongate grooves in the box profile are additionally connected therewith by welding.

With the construction according to the invention, the entire mounting device of a tailgate may be made up of a few basic components, e.g., three extruded hollow aluminum profiles or braces. The structure of the device itself is very simple since the support flanges, once they have been cut, may be inserted or snap-fitted into the box profile without further processing, subsequent securing being carried out by short welding seams or welding spots. It is not necessary further to process the through-channels in the support flanges; if anything, they need simply to be wiped and are thereafter in condition for receiving the support bolts of the lifting and pivoting devices. At the same time, the construction in accordance with the invention may be easily adapted to different vehicles since the support flanges may be inserted into the elongate groove at any position, and they may then be slidingly adjusted before the ends of the cantilevers are secured by welding.

In accordance with a preferred embodiment of the invention, undercut elongate grooves are distributed on the circumference of the hollow box profile for receiving nuts of anchor bolts for securing the profile of the frame of the vehicle.

In accordance with a further embodiment of the invention, the support flanges provided at the front surface of the tailgate are provided with cantilevers at their sides facing away from their cylindrical through-channels for welding connection with the tailgate.

Alternatively, the support flanges provided on the front surface of the tailgate may be put together of two partial profiles of which an upper partial profile may be welded to the tailgate and a lower profile is positively or frictionally inserted into grooves of the upper partial profile, the inserted cantilevers being preferably additionally welded to the upper partial profile.

In accordance with another embodiment of the invention hydraulic fluid conduits may be provided in the walls of the box profile and extend in the longitudinal direction thereof. These conduits may be connected to conduits of the hydraulic aggregate or of the lifting and pivoting device by means of threaded bores provided at the connections of the hydraulic aggregate of the lifting and pivoting device in the walls of the hollow box profile and extending up to the conduits.

In such an arrangement it is only necessary at the connection of the hydraulic aggregate to provide a threaded bore for connection with the tube conduit of the hydraulic aggregate, the threaded bore being connected to the hydraulic fluid conduit and receiving the connecting element of the tube conduit of the hydraulic aggregate.

BRIEF DESCRIPTION OF THE SEVERAL DRAWINGS

The invention will hereinafter be described on the basis of embodiments with reference to schematic drawings, in which.

DETAILED DESCRIPTION OF PREFERRED EMBODIMENTS

Figure 1:
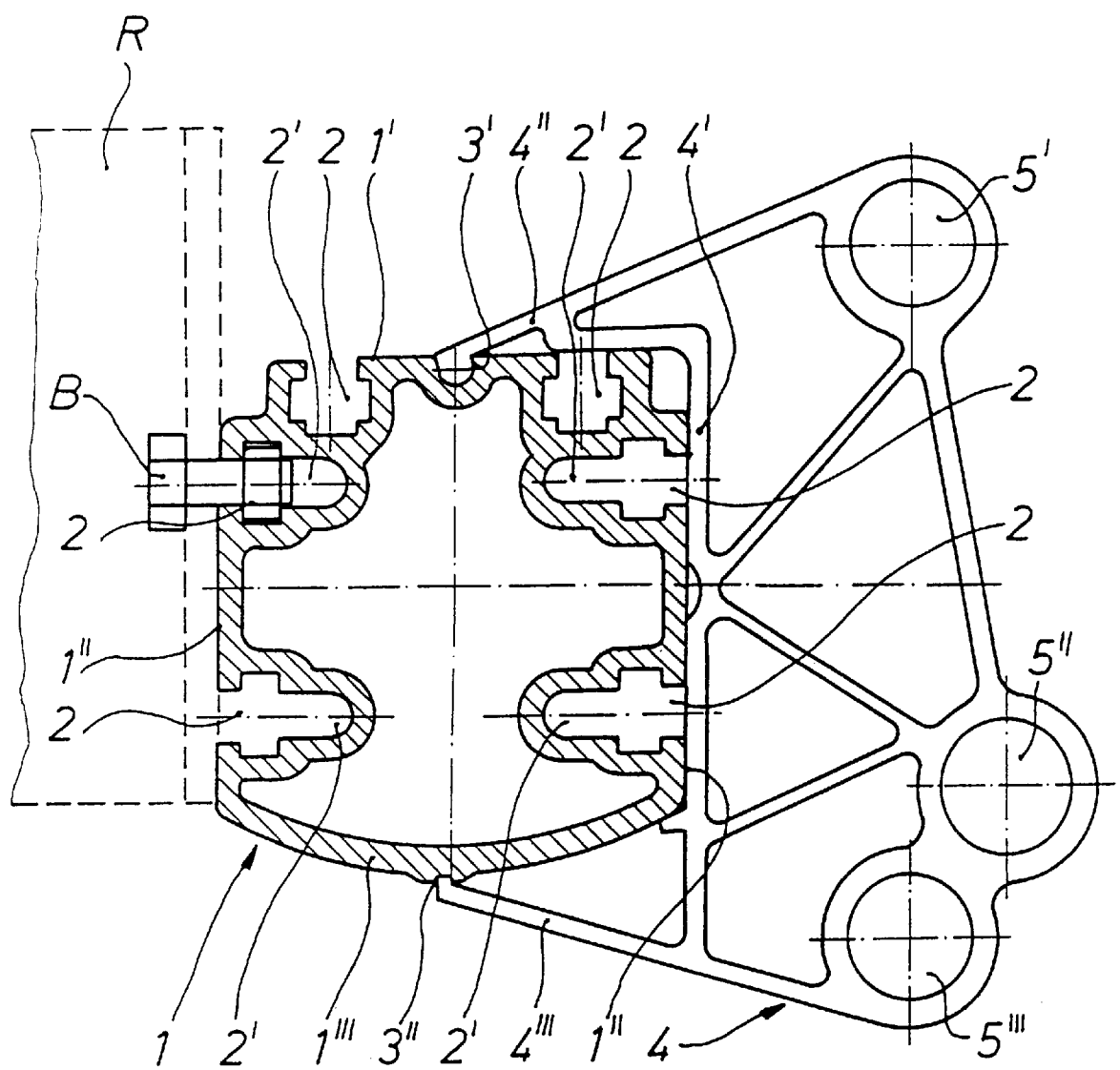
FIG. 1 is a partial cross-section of that portion of a mounting device in accordance with the invention to be mounted on the vehicle.

In accordance with FIG. 1, the portion of the mounting device to be mounted to the vehicle comprises an extruded hollow box profile 1 made from aluminum and attached to the rear transverse frame component R, indicated in FIG. 1, of the truck, by bolts B. The nuts of the bolts are received in undercut elongate grooves 2 of the hollow box profile 1. The grooves 2 provided in the vertical sides of the profile are provided with grooved bottoms 2' in which electric and/or hydraulic conduits may be received. The hollow box profile has a planar upper surface 1', two vertical side walls 1" and a convexly bulging lower surface 1'". In the upper and lower surface 1' and 1" of the hollow box profile 1 there are provided grooves 3' and 3" extending longitudinally thereof for connecting support flanges 4 at a spacing from each other, as will be explained infra.

The support flanges 4 are sections of an aluminum profile which is also extruded having a vertical member 4', with cantilever arms 4", 4'" extending from the upper and lower ends thereof. At their free ends the arms 4", 4'" are positively and frictionally snapped into the longitudinal grooves 3', 3" of the hollow box profile 1. To this end, the upper groove 3' is of rounded cross-section so that it may receive the end of the arm 4" which is formed as a rounded bead. This arm is inserted firs, and the other arm is snapped into the groove 3" by pivoting the support flange 4. The snap connection of the ends of the cantilever arms is additionally affixed by welding seams, not shown.

Each support flange 4 is severed from the unitary extruded hollow profile at a required width or size. The support flange 4 is provided with a plurality of internal chambers and arms, and as shown in FIG. 1, on its side opposite arms 4", 4'" it is provided with three cylindrical through-channels 5', 5", 5'" for receiving the support bolts (not shown) of a lift arm, a pivot cylinder and a lift cylinder of the tailgate. Structuring the support flanges 4 as sections of a hollow profile extruded with great precision offer the advantage that the through-channels need only be wiped and do not require any other processing.

Figure 2:
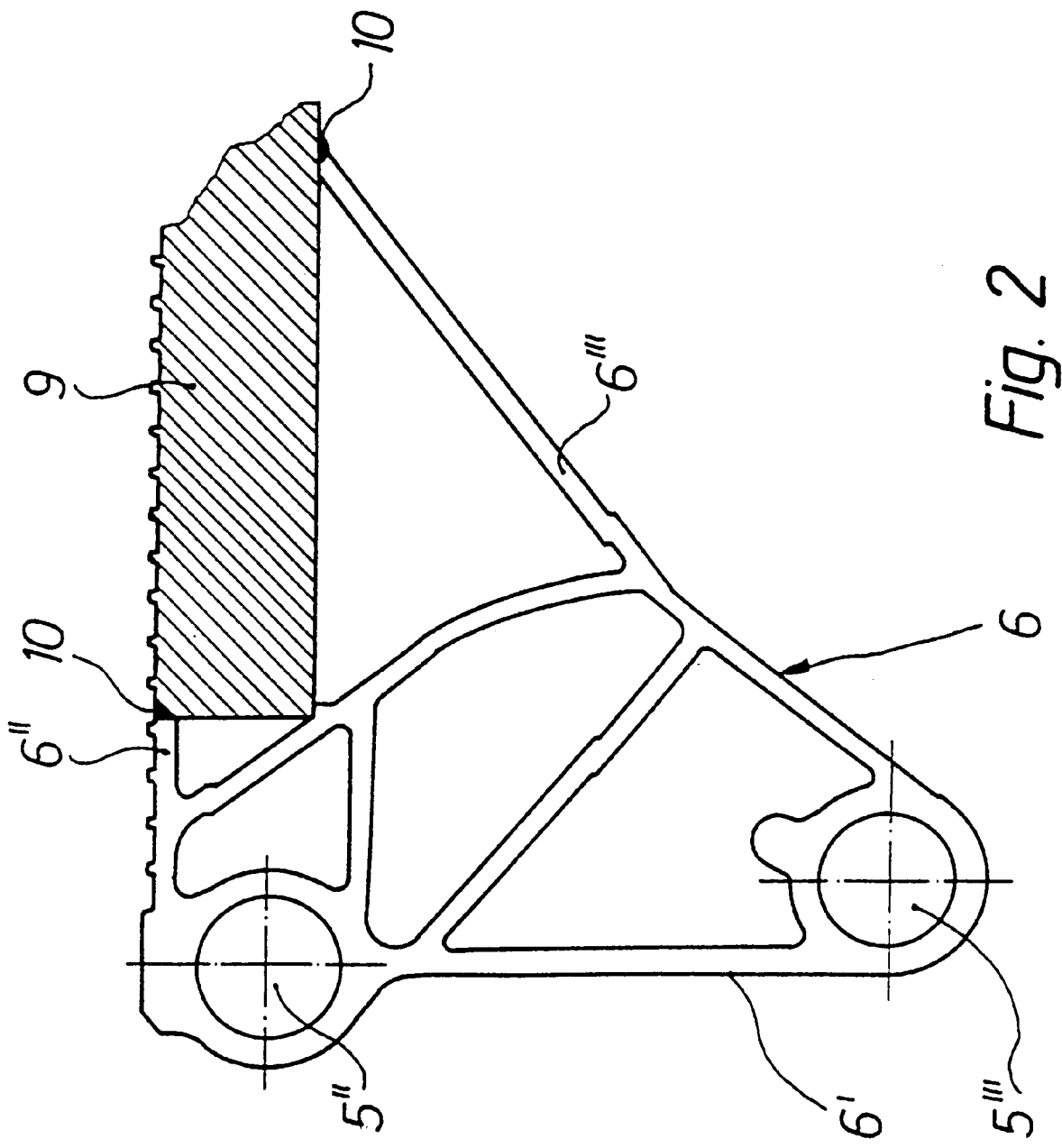
FIG. 2 is an elevation, partially in section, of that portion of the device to be mounted on the tailgate.

In accordance with FIG. 2, the front surface of the tailgate (not shown) placed opposite the support flanges 4 and engaged by the lift and pivot arms, is also provided with support flanges 6, made of sections of an extruded hollow profile of aluminum. It has a vertical member 6' at the upper and lower sides of which there are provided through-channels for receiving support bolts of the lift cylinder or the pivot cylinder. The hollow profile 6 also has internal chambers and arm members as well as cantilevering arms 6", 6'" by which it is affixed to the tailgate 9 by welding seams 10, the tailgate 9 constituting the load bearing surface.

Figure 3:
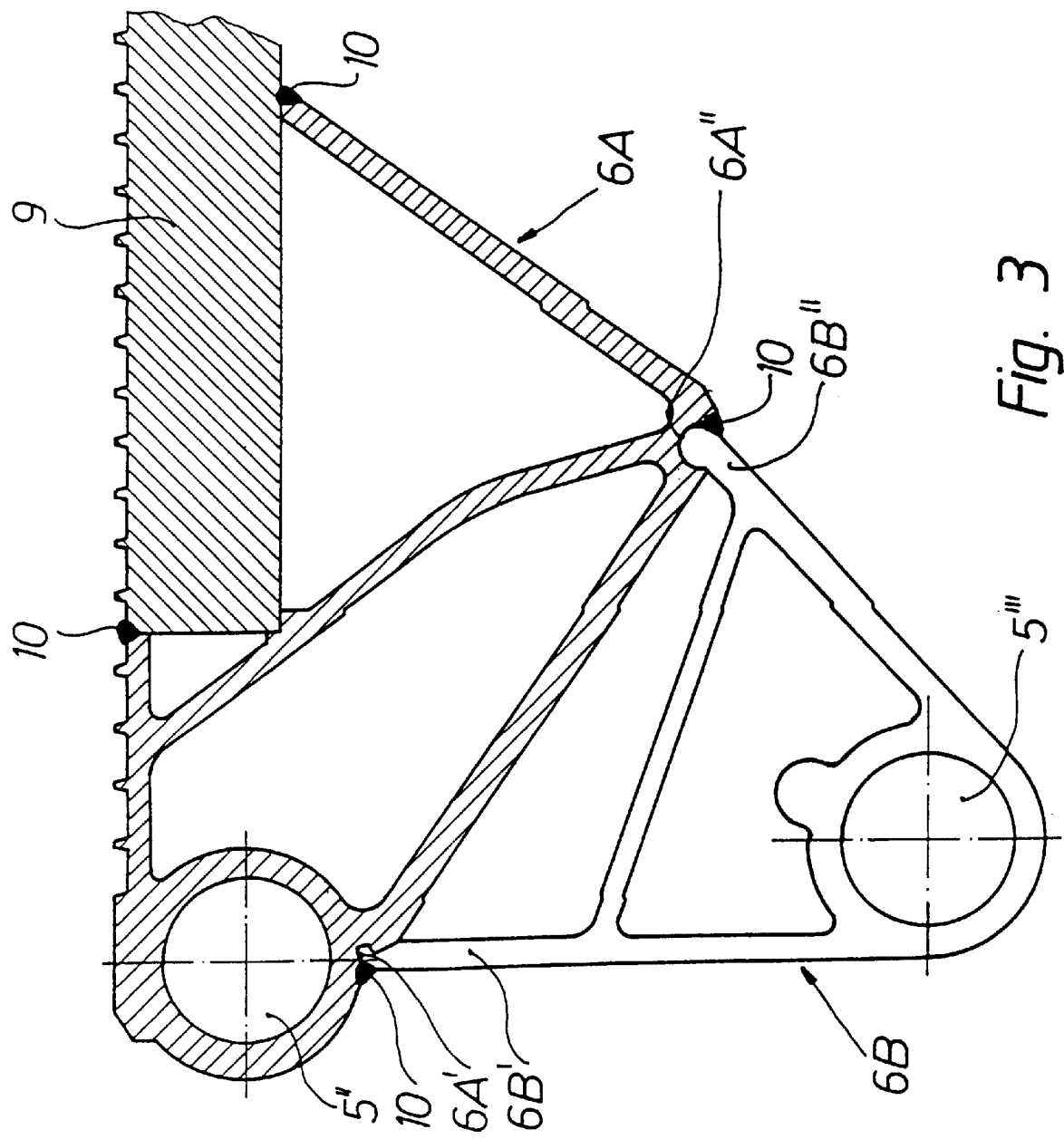
FIG. 3 is an elevation, partially in section, of an alternative embodiment of the portion to be mounted on the tailgate.

As shown in FIG. 3, the support flanges 6 of the tailgate may be structured of two parts, i.e. of two sections of two different hollow extruded profiles made of aluminum. The upper partial profile 6A is connected by welding seams as in FIG. 3 to the loading platform 9 proper, whereas the lower portion is positively and frictionally snapped into grooves 6A', 6A" of the upper portion by cantilever arms 6B', 6B", and is additionally affixed thereto by welding seams 10. The upper partial profile 6A is provided with a through-channel 5" for the lift cylinder, and the lower partial profile 6B is provided with the through-channel 5'" for the pivot cylinder.

Figure 4:
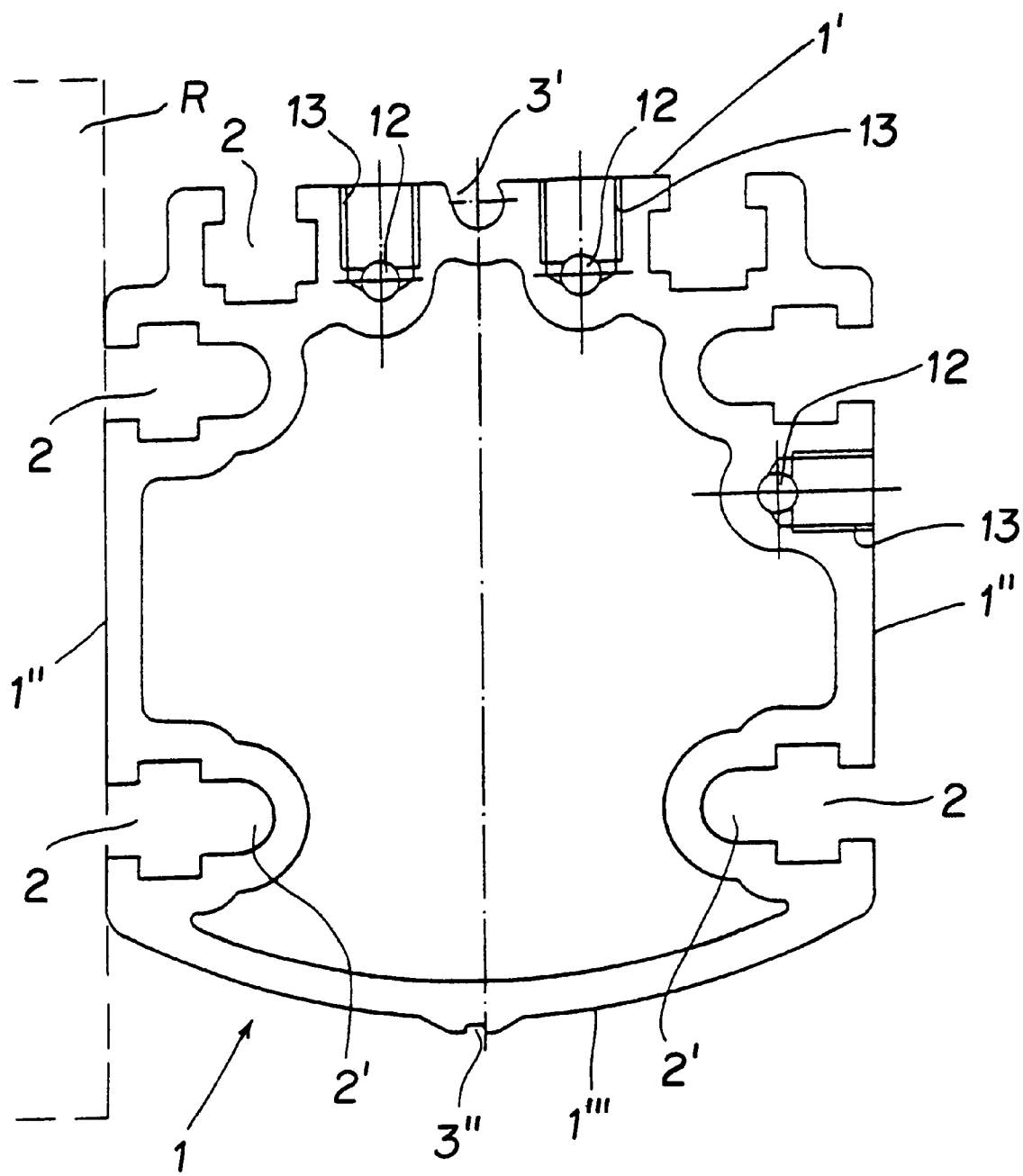
FIG. 4 depicts, partially in section, the portion of another mounting device in accordance with the invention, to be mounted on the vehicle.
Figure 5:
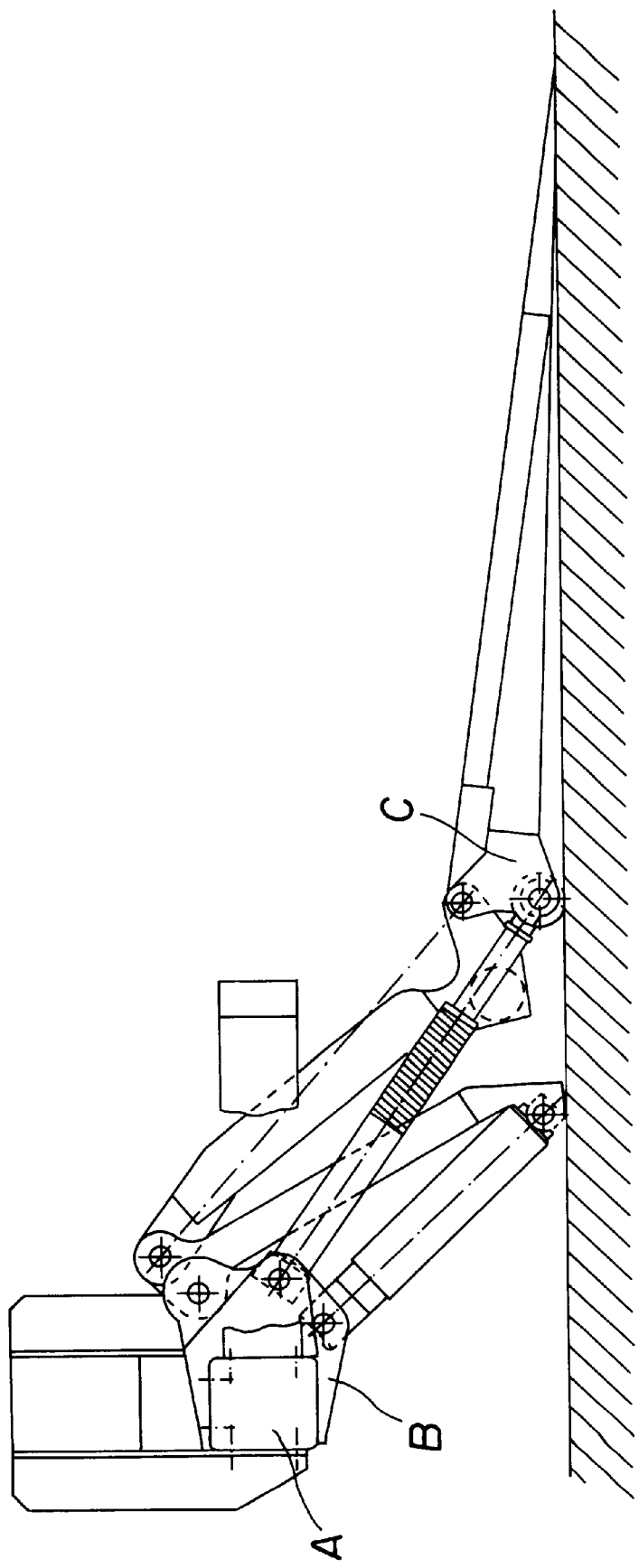

In accordance with FIG. 4, longitudinal channels 12 are formed in the walls of the hollow box profile during the extrusion process. These channels 12 serve as conduits for hydraulic fluid from the connection of the hydraulic aggregate to the connections of the support flanges of the lift and pivot devices. At the connection positions threaded bores 13 are formed in the walls of the hollow box profile which bores extend to the flow conduits 12 and into which the (not shown) given hydraulic conduits of the hydraulic aggregate or of the lift and pivot devices are threaded. This threaded connection provides in a simple manner for a direct connection between the hydraulic conduits and the channels of the hollow box profile. In this manner, special laying of hydraulic conduits in the hollow box profile and the possibility of leakage are prevented.

It will be understood that the described embodiments may be altered in different ways, in particular as regards the configuration of individual extruded aluminum profiles and their additional fixing, for instance at the hollow box profile which may be accomplished by threaded bolts rather than by welding.

I claim:

1. Device for mounting a hydraulically operated tailgate on a frame member of a truck, comprising:

a first extruded elongate hollow member of substantially quadrangular cross-section made of aluminum and having upper and lower surfaces respectively provided with first and second elongate grooves;

a second extruded elongate hollow member comprising a pair of parallel cantilever arms having end sections for securing in the first and second elongate grooves and plurality of bores for pivotally mounting first ends of tailgate lifting and pivoting apparatus; and a third extruded elongate hollow member comprising means for securing the tailgate and a plurality of bores for pivotally mounting opposite ends of the tailgate lifting and pivoting apparatus.

* * * * *